US009535518B2

United States Patent
Kang et al.

(10) Patent No.: US 9,535,518 B2
(45) Date of Patent: Jan. 3, 2017

(54) TOUCH SCREEN PANEL, METHOD OF MANUFACTURING THE SAME, AND MOBILE DEVICE WITH THE SAME

(71) Applicant: Samsung Electronics Co. Ltd.

(72) Inventors: Jin Goo Kang, Suwon-si (KR); Jung Won Kim, Suwon-si (KR); Ji Hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 13/648,562

(22) Filed: Oct. 10, 2012

(65) Prior Publication Data

US 2013/0113732 A1    May 9, 2013

(30) Foreign Application Priority Data

Nov. 8, 2011    (KR) .......................... 10-2011-0115914

(51) Int. Cl.
*G06F 3/041* (2006.01)
*H05K 13/00* (2006.01)
*G06F 3/044* (2006.01)

(52) U.S. Cl.
CPC ............... *G06F 3/041* (2013.01); *G06F 3/044* (2013.01); *G06F 2203/04103* (2013.01); *G06F 2203/04107* (2013.01); *Y10T 29/49105* (2015.01)

(58) Field of Classification Search
CPC .................... G06F 3/044; G06F 3/0412; G06F 2203/04107; G06F 3/041; G06F 2203/04103; Y10T 29/49105

USPC .... 345/173–174; 178/18.06, 18.08; 156/349; 427/96.8–97.1

See application file for complete search history.

(56) References Cited

U.S. PATENT DOCUMENTS

| | | |
|---|---|---|
| 2003/0169392 A1 | 9/2003 | Park et al. |
| 2005/0017956 A1 | 1/2005 | Mai |
| 2006/0008665 A1 | 1/2006 | Kotsubo et al. |
| 2008/0180584 A1* | 7/2008 | Utsunomiya et al. .......... 349/12 |
| 2009/0096761 A1* | 4/2009 | Cho ....................... G06F 3/044 345/174 |
| 2010/0265207 A1* | 10/2010 | Chen ............................ 345/174 |
| 2011/0005662 A1* | 1/2011 | Sung ............................. 156/153 |
| 2011/0032193 A1* | 2/2011 | Szalkowski ................... 345/173 |
| 2011/0100727 A1* | 5/2011 | Choi et al. ................. 178/18.01 |
| 2011/0109583 A1* | 5/2011 | Lee ............................... 345/174 |
| 2011/0148823 A1* | 6/2011 | Chen ............................. 345/176 |
| 2011/0169783 A1* | 7/2011 | Wang et al. .................. 345/176 |
| 2011/0242018 A1* | 10/2011 | Kang et al. ................... 345/173 |

(Continued)

FOREIGN PATENT DOCUMENTS

| | | |
|---|---|---|
| CN | 1745439 A | 3/2006 |
| CN | 201804311 U | 4/2011 |

(Continued)

*Primary Examiner* — Lun-Yi Lao
*Assistant Examiner* — Elliott Deaderick
(74) *Attorney, Agent, or Firm* — Jefferson IP Law, LLP

(57) ABSTRACT

A capacitive touch screen panel and a mobile device with the panel are provided. The touch screen panel includes a glass cover for transmitting light and protecting the touch screen panel, a sensor sheet that forms an electrode pattern including first and second electrodes on the upper surface which is attached on the lower surface of the glass cover, and a noise shield sheet, coated on the lower surface of the sensor sheet, for allowing the transmission of light and blocking noise flowing to the electrode pattern.

11 Claims, 6 Drawing Sheets

(56) References Cited

U.S. PATENT DOCUMENTS

2012/0086669 A1* 4/2012 Kim et al. .................... 345/174
2012/0120011 A1* 5/2012 Teng ........................ G06F 3/044
                                                                                345/173
2012/0249458 A1* 10/2012 Okazaki .................. G06F 3/044
                                                                                345/173

FOREIGN PATENT DOCUMENTS

| | | |
|---|---|---|
| JP | 2008-153138 A | 7/2008 |
| KR | 10-2010-0091173 A | 8/2010 |
| TW | 1250456 B | 3/2006 |

* cited by examiner

TOUCH SCREEN PANEL, METHOD OF MANUFACTURING THE SAME, AND MOBILE DEVICE WITH THE SAME

PRIORITY

This application claims the benefit under 35 U.S.C. §119(a) of a Korean patent application filed on Nov. 8, 2011 in the Korean Intellectual Property Office and assigned Serial No. 10-2011-0115914, the entire disclosure of which is hereby incorporated by reference.

BACKGROUND OF THE INVENTION

1. Field of the Invention

The present invention relates to electronic devices. More particularly, the present invention relates to a capacitive touch screen and a mobile device with the touch screen.

2. Description of the Related Art

With the rapid development of information and communication technology and semiconductor technology, the use of various types of mobile devices has also increased. Because of mobile convergence, many mobile devices are configured to provide additional service functions provided by other types of mobile systems, in addition to the traditional service functions provided by mobile devices. For example, mobile devices may provide additional functions in addition to the general communication functions such as a voice call, and message transmission and reception. Examples of the additional functions that may be provided by a mobile device include a TV viewing function (e.g., mobile broadcasting, such as Digital Multimedia Broadcasting (DMB), Digital Video Broadcasting (DVB), etc.), a multimedia function (e.g., audio data playback (e.g., MPEG Audio Layer 3 (MP3), video data playback), and the like.

Mobile devices are equipped with various types of input units. For example, mobile devices may be equipped with touch screens. Touch screens each detect the presence and location of a touch of an approach by objects (e.g., a finger or a stylus), create the touch event, and transmit the signal corresponding to the event to the controller of the mobile device. Touch screens have been developed to be thin and simple in configuration.

Touch screens according to related art may each include a sensor sheet with an anti-reflection sheet (to enhance the visibility) and a noise shield sheet. A sensor sheet detects the presence and location of a touch or an approach by a passive object (e.g., finger). However, it is difficult to design and manufacture conventional touch screens that are relatively slim because of the noise shield sheet and the anti-reflection sheet. During the manufacture of touch screen, attaching a noise shield sheet and an anti-reflection sheet to a sensor sheet is performed by a cell unit. This restricts the mass production of touch screens and it takes a great deal of time to manufacture the products, thereby increasing manufacturing costs.

Therefore, a need exists for a touch screen that is simple in configuration and thus mass produced via simple processes and a mobile device equipped with such a touch screen.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a touch screen that is relatively thin, and a mobile device equipped with the touch screen.

Another aspect of the present invention is to provide a touch screen that is simple in configuration and thus mass-produced via simple processes, and a mobile device equipped with the touch screen.

In accordance with an aspect of the present invention, a touch screen panel is provided. The panel includes a glass cover for transmitting light and for protecting the touch screen panel, a sensor sheet including an electrode pattern formed thereon, wherein the electrode pattern includes first and second electrodes on the upper surface of the sensor sheet which is attached on the lower surface of the glass cover, and a noise shield sheet, coated on the lower surface of the sensor sheet, for allowing the transmission of light and for blocking noise flowing to the electrode pattern.

In accordance with another aspect of the invention, a mobile device is provided. The device includes a display panel, and a touch screen panel, attached to an upper surface of the display panel, for allowing the transmission of light and for sensing at least one of approaches and touches by a passive object on the surface. The touch screen panel includes a glass cover for transmitting light and for protecting the touch screen panel, a sensor sheet including an electrode pattern formed thereon, wherein the electrode pattern includes first and second electrodes on the upper surface of the sensor sheet which is attached on the lower surface of the glass cover, and a noise shield sheet, coated on the lower surface of the sensor sheet, for allowing the transmission of light and for blocking noise flowing to the electrode pattern.

In accordance with another aspect of the invention, a method of manufacturing a touch screen panel is provided. The method includes forming an electrode pattern, including first and second electrodes, on an upper surface of a sensor sheet for sensing a presence of touches, coating, on the lower surface of the sensor sheet, a noise shield sheet for blocking noise flowing to the electrode pattern, cutting the sensor sheet in preset cell units, and attaching a number of cut sensor sheets to the lower surfaces of a number of glass covers.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions incorporated may be omitted for clarity and conciseness.

The terms or words used in the following description and claims are not be limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood that a touch screen according to exemplary embodiments of the present invention can be applied to all types of electronic devices including mobile devices if such electronic devices have the displays and the input units. The mobile device with the touch screen includes all information communication devices, multimedia devices, and their applications, which are operated according to communication protocols corresponding to various types of communication systems. For example, the mobile device can be applied to mobile communication terminals, digital broadcast players, Personal Digital Assistants (PDAs), smartphones, tablet personal computers, handheld PC, and the like. In the following description, it is assumed that mobile devices are smart phones.

Figure 1:
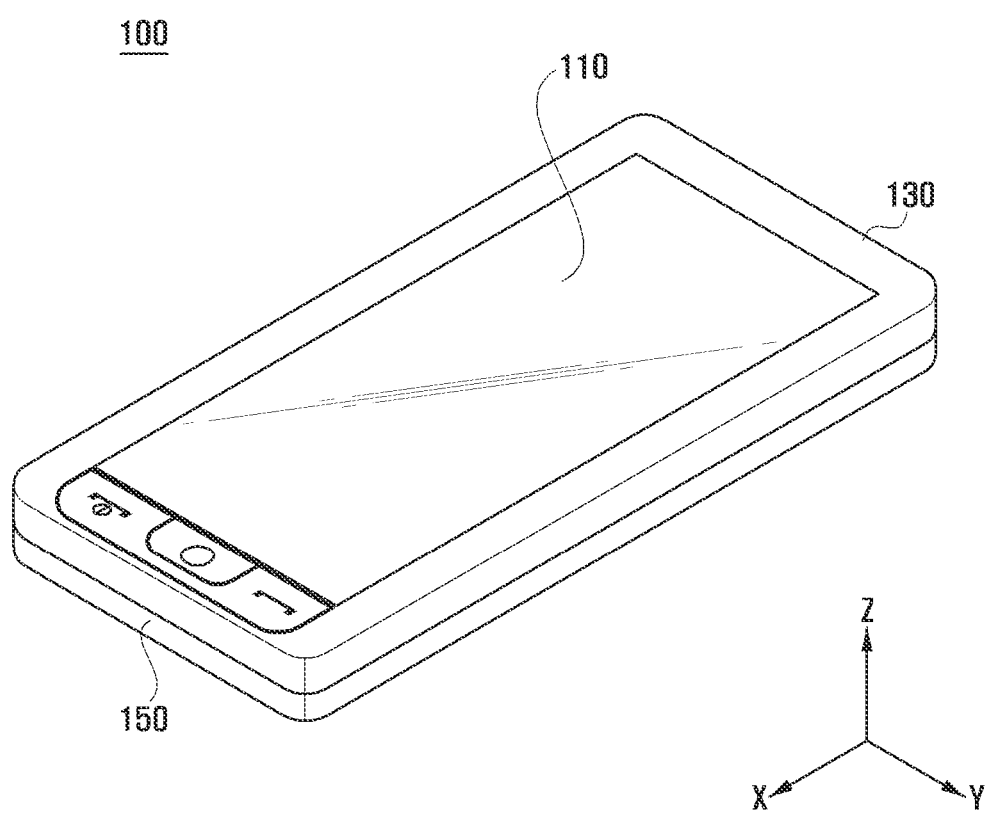
FIG. 1 illustrates a perspective view of a mobile device with a touch screen according to an exemplary embodiment of the present invention.
Figure 2:
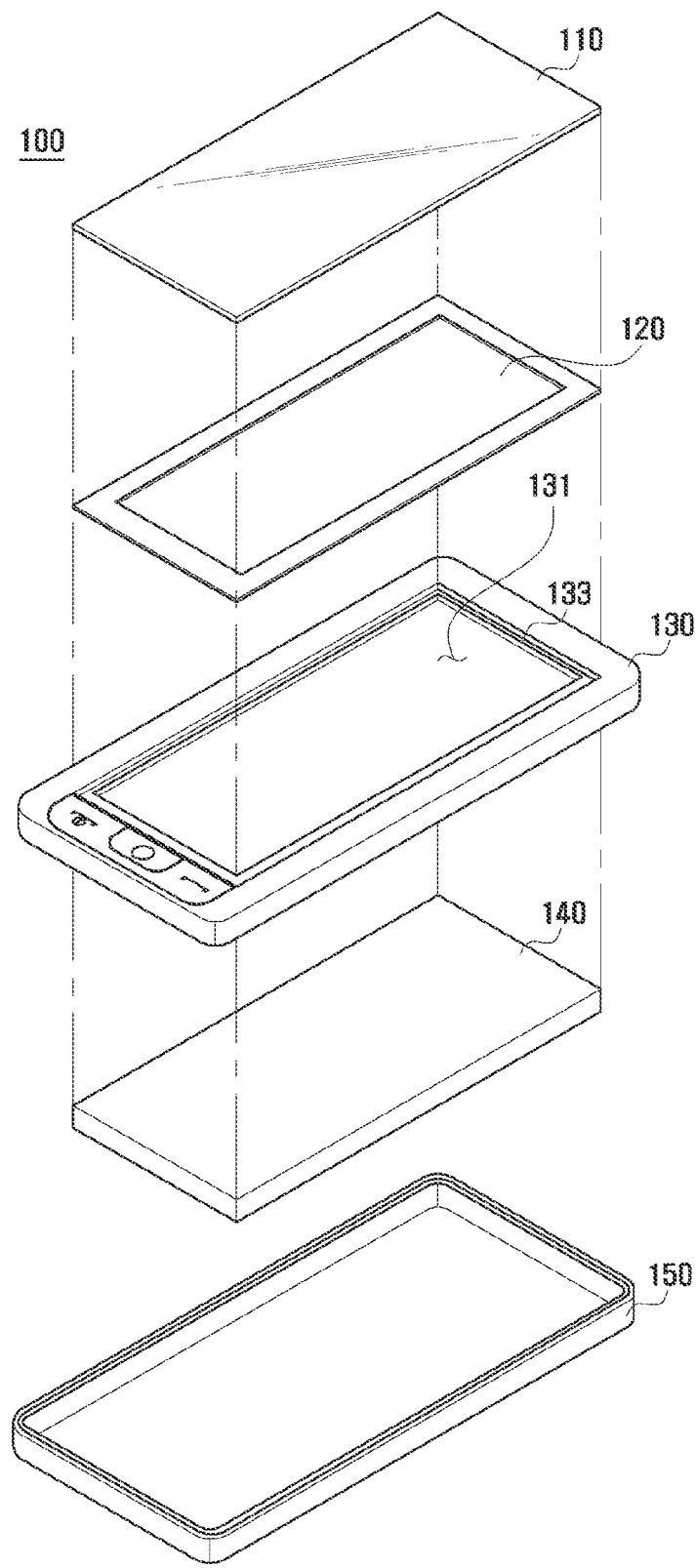
FIG. 2 illustrates an exploded perspective view of a mobile device with a touch screen according to an exemplary embodiment of the present invention.

FIG. 1 illustrates a perspective view of a mobile device with a touch screen according to an exemplary embodiment of the present invention. FIG. 2 illustrates an exploded perspective view of a mobile device with a touch screen according to an exemplary embodiment of the present invention.

Referring to FIGS. 1 and 2, the mobile device 100 includes a body and a touch screen. The touch screen includes a touch screen panel 110, a cover adhesive sheet 120, a cover chassis 130, a display panel 140, and a panel bracket 150.

The touch screen panel 110 protects the internal components of the mobile device 100. The panel 110 is placed on the front of the display panel 140. The panel 110 detects the presence of a touch on the surface. The panel 110 creates events according to the user's touches and transfers the signals corresponding to the events to the controller of the mobile device 100 (not shown). After receiving the signals corresponding to the touch events, the controller controls the entire operation of the components in the mobile device 100 and performs a data process. The touch screen panel 110 may be implemented with various types of sensors, such as a capacitive type, an electronic inductive type, a combination thereof, and/or the like.

The cover adhesive sheet 120 couples the components (i.e., the touch screen panel 110, the cover chassis 130, and the display panel 140) to each other. As an example, the cover adhesive sheet 120 may be formed as a frame type of tape (e.g., Optical Clear Adhesive (OCA), Super View Resin (SVR), and/or the like).

The cover chassis 130 protects the internal components of the mobile device 100, with the touch screen panel 110. The cover chassis 130 is formed as the shape of the body of the mobile device 100. As an example, the cover chassis 130 may be made of synthetic resins. Alternatively, the cover chassis 130 may also be made of metal such as stainless steel, Titanium (Ti), and/or the like. The cover chassis 130 has a reception hole 131 formed in the center thereof. The reception hole 131 formed in the cover chassis 130 receives the touch screen panel 110 via the cover adhesive sheet 120. The cover chassis 130 further includes a receipt stopper 133 formed around the reception hole 131. The receipt stopper 133 protrudes towards the center and allows for the placement of the touch screen panel 110, by supporting the cover adhesive sheet 120. That is, the receipt stopper 133 supports the touch screen panel 110.

The display panel 140 is placed under the reception hole 131 of the cover chassis 130 opposite the touch screen panel 110. The display panel 140 is protected by the touch screen panel 110 and the cover chassis 130. The display panel 140 converts video data from the controller to analog signals, and displays the analog signals. The display panel 140 may include a Back Light Unit (BLU), a flat display panel (e.g., a Liquid Crystal Display (LCD)), an Organic Light Emitting Diode (OLED), an Active Matrix Organic Light Emitting Diodes (AMOLED), and/or the like.

The panel bracket 150 fixes the internal components of the mobile device 100 to the body. The panel bracket 150 is configured to allow for the placement of the display panel 140. The panel bracket 150 protects the internal components, with the touch screen panel 110 and the cover chassis 130. The panel bracket 150 is formed as the shape of the body of the mobile device 100. That is, the panel bracket 150 operatively forms the internal space, by coupling to the cover chassis 130 with the edge.

As described above, the cover adhesive sheet 120 couples the touch screen panel 110, the cover chassis 130, and the display panel 140 to each other. The coupling of the touch screen panel 110, the cover chassis 130, and the panel bracket 150 forms the internal space in which the display panel 140 is placed.

Figure 3:
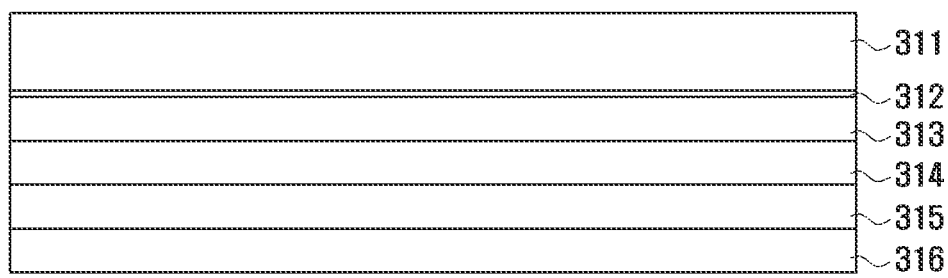
FIG. 3 illustrates a cross-sectional view of a touch screen panel where an electrode pattern is formed on a glass cover according to an exemplary embodiment of the present invention.

FIG. 3 illustrates a cross-sectional view of a touch screen panel 310 where an electrode pattern is formed on the glass cover according to an exemplary embodiment of the present invention.

Referring to FIG. 3, the touch screen panel 310 includes a glass cover 311 on one side of which an electrode pattern 312 including first and second electrodes is formed. The electrode pattern 312 is covered with a noise shield sheet 314 by a first adhesive 313. The noise shield sheet 314 protects the electrode pattern 312 from noise created in the components of the mobile device 100. The noise shield sheet 314 is also covered with an anti-reflection sheet 316 by a second adhesive 315. The anti-reflection sheet 316 prevents the light from the internal light source of the mobile device 100 from being reflected to the inside, thereby enhancing the visibility of the display.

Figure 4:
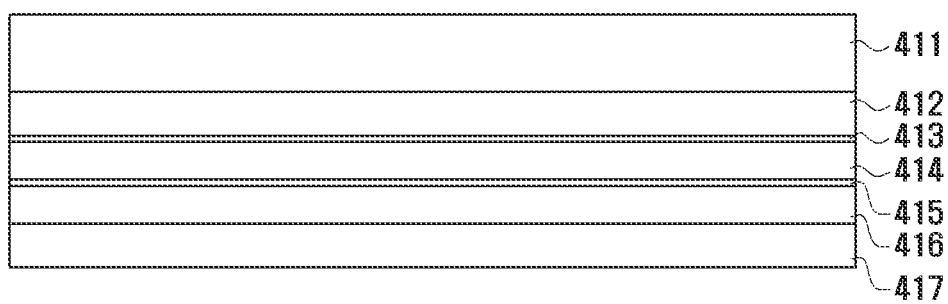
FIG. 4 illustrates a cross-sectional view of a touch screen panel where an electrode pattern is formed on an additional sensor sheet according to an exemplary embodiment of the present invention.

FIG. 4 illustrates a cross-sectional view of a touch screen panel 410 where an electrode pattern is formed on an additional sensor sheet according to an exemplary embodiment of the present invention.

Referring to FIG. 4, the touch screen panel 410 includes a glass cover 411. A sensor sheet 414 made of glass includes a first electrode 413 and a second electrode 415 formed on opposite sides thereof. The sensor sheet 414 is attached on one side of the glass cover 411 via a first adhesive 412. The second electrode 415 has a noise shield function. Because the second electrode includes a noise shield function, an additional noise shield sheet is not required in the touch screen panel 410. The second electrode 415 may be further covered with an anti-reflection sheet 417 by a second adhesive 416.

As described above, the touch screen panel 310 as shown in FIG. 3 is configured in such a way that the noise shield sheet 314 and the anti-reflection sheet 316 are stacked, in order, on the glass cover 311, as a manner of film adhesion. In contrast to the touch panel 310 of FIG. 3, the touch screen panel 410 as shown in FIG. 4 is configured in such a way that the anti-reflection sheet 417 is attached on the sensor sheet 414, without an additional noise shield sheet. Although the touch screen panels are configured in such a way that the components are coupled to each other in the manner of film adhesion in order to reduce the volume or thickness of the touch screen panel, it should be understood that exemplary embodiments of the present invention are not limited to this adhesion method.

Figure 5:
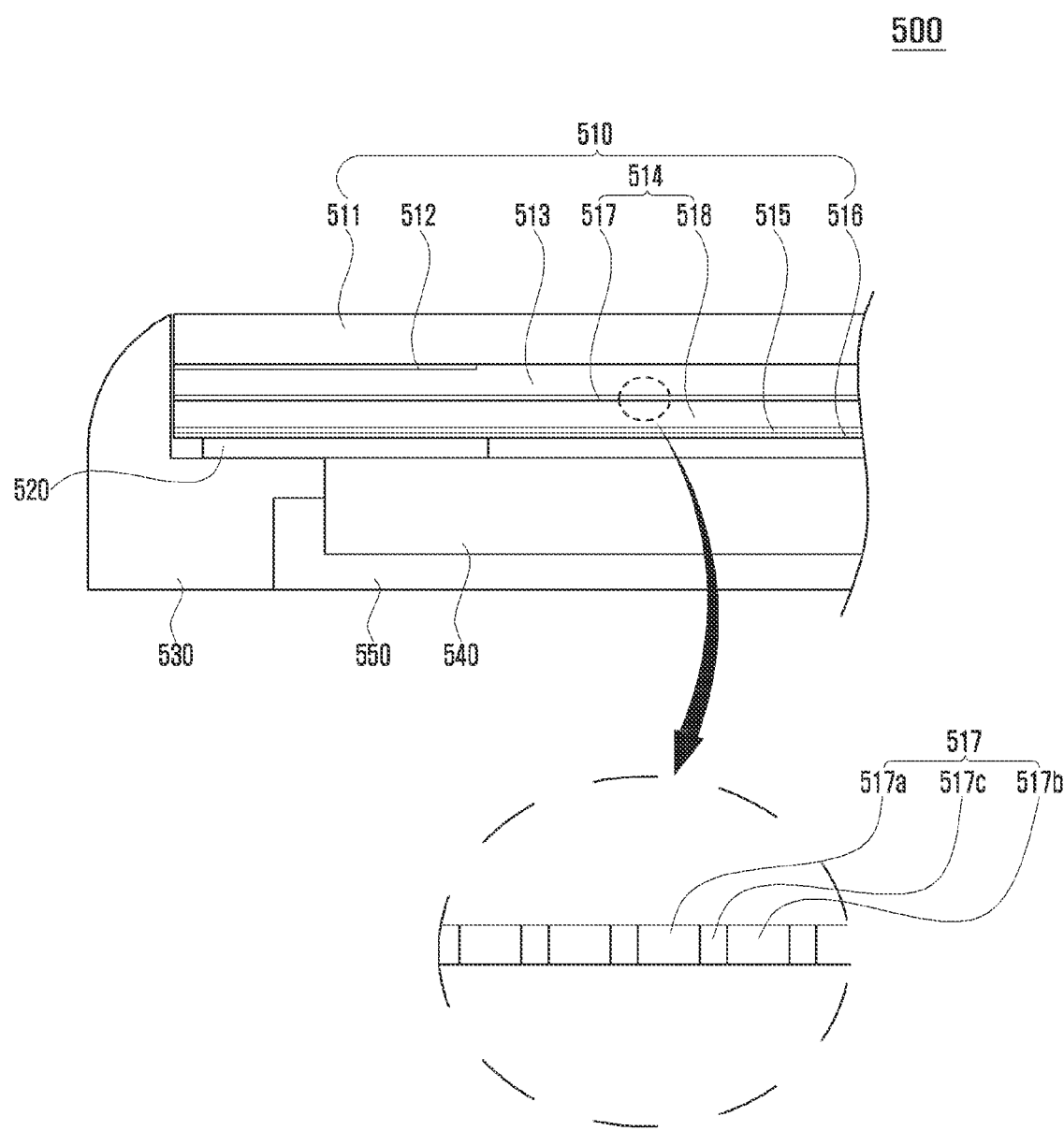
FIG. 5 illustrates a cross-sectional view of a primary part of a mobile device with a touch screen according to an exemplary embodiment of the present invention.

FIG. 5 illustrates a cross-sectional view of a primary part of a mobile device 500 with a touch screen according to an exemplary embodiment of the present invention.

Referring to FIG. 5, the touch screen panel 510 may be configured by assembling the panel-related components. That is, the touch screen panel 510 includes a glass cover 511, a light-tight sheet 512, an adhesive sheet 513, a sensor sheet 514, and a noise shield sheet 515. The touch screen panel 510 may also include an anti-reflection sheet 516 that prevents the light from the internal light source of the mobile device 500 from being reflected to the inside.

The glass cover 511 is a component that is exposed to the outside environment and thus allows for the contact of a touch object as an input means. In other words, for example, a user may input commands using touch events by touching or otherwise engaging the glass cover 511. The glass cover 511 transmits light from the internal light source to the outside of the mobile device 500. The glass cover 511 also transmits light from the outside to the inside of the mobile device 500.

The light-tight sheet 512 is placed between the glass cover 511 and the adhesive sheet 513. The light-tight sheet 512 is arranged along the edge of the glass cover 511 and the adhesive sheet 513 so that the center portion of the glass cover 511 and the adhesive sheet 513 is disclosed to the outside of the mobile device 500. The light-tight sheet 512 prevents light from the internal light source of the mobile device 500 from being transmitted to the outside. The light-tight sheet 512 also prevents light incident from the outside of the mobile device 500 from being transmitted to the inside. The light-tight sheet 512 forms a transparent area for transmitting light from the display panel 140 and a blocking area, formed around the transparent area, for blocking light. That is, the light-tight sheet 512 defines the transparent area of the touch screen panel 510. Light from the display panel 140 may be transmitted through the transparent area of the touch screen panel 510 to the outside of the mobile device 500. The light-tight sheet 512 may be patterned on the lower surface of the glass cover 511.

The adhesive sheet 513 is placed between the glass cover 511 and the sensor sheet 514. That is, the adhesive sheet 513 and the sensor sheet 514 are attached to the lower surface of the glass cover 511. The adhesive sheet 513 transmits light from the internal light source of the mobile device 500 through the glass cover 511. The adhesive sheet 513 also transmits light incident on the glass cover 511 from the outside to the inside of the mobile device 500. The adhesive sheet 513 may be implemented with an OCA.

The sensor sheet 514 is attached to the lower surface of the glass cover 511 by the adhesive sheet 513. The sensor sheet 514 senses an approach or a touch by a passive object on the glass cover 511, creates the signal corresponding to the approach or the touch, and transfers the signal to the controller (not shown). That is, when a passive object approaches or touches the glass cover 511, the sensor sheet 514 changes in the capacitance at a location corresponding to the approach or the touch. The sensor sheet 514 includes a substrate 518 and an electrode pattern 517 formed thereon. The substrate 518 may be implemented with a glass plate or a film made of polyester, polycarbonate, and/or the like. The electrode pattern 517 is patterned on the substrate 518. For example, the electrode pattern 517 includes first 517a and second 517b electrodes and insulation film 517c. Patterning first 517a and second 517b electrodes on a glass plate may be Glass Tx/Rx (G2) or Direct Patterned Window (DPW), which is well-known to a person skilled in the art. Therefore, a detailed description will be omitted in the application. The sensor sheet 514 transmits light from the internal light source of the mobile device 500 through the adhesive sheet 513. The sensor sheet 514 also transmits light from the adhesive sheet 513 to the inside of the mobile device 500. To this end, the substrate 518 may be implemented with a glass plate and the electrode pattern 517 may be a transparent conductive film (e.g., Indium Tin Oxide (ITO)).

The noise shield sheet 515 transmits light from an internal light source of the mobile device 500 through the sensor sheet 514. The noise shield sheet 515 also transmits light from the sensor sheet 514 to the inside of the mobile device 500. The noise shield sheet 515 is attached to the lower surface of the sensor sheet 514 (i.e., the substrate 518), and prevents noise created in the inside of the mobile device 500 (e.g., the display panel 540), from flowing in the first 517a and second 517b electrodes of the sensor sheet 514. As an example, the noise shield sheet 515 may be implemented with a transparent conductive film (e.g., ITO). Alternatively, the noise shield sheet 515 may also be implemented with nano-mesh or an inorganic nanostructure two-dimensional material, such as Graphene. In an exemplary embodiment of the present invention, the noise shield sheet 515 may be formed as a coating layer on the lower surface of the sensor sheet 514, via deposition for example. During the coating process for the noise shield sheet 515, the lower surface of the substrate 518 of the sensor sheet 514 may be damaged.

However, because this damage on the substrate 518 does not directly affect the electrode pattern 517, the performance of sensing touch is not deteriorated.

The anti-reflection sheet 516 is attached on the lower surface of the noise shield sheet 515. The anti-reflection sheet 516 transmits light from the internal light source of the mobile device 500 through the noise shield sheet 515. The anti-reflection sheet 516 prevents light from the internal light source of the mobile device 500 from being reflected in the inside, thereby enhancing the light efficiency of the display panel 540. To this end, the anti-reflection sheet 516 may be implemented with a transparent conductive film (e.g., silicon (SiO2)). According to exemplary embodiments of the present invention, the anti-reflection sheet 516 is formed in such a way that silicon is deposited on the lower surface of the noise shield sheet 515. The noise shield sheet 515 transmits the incident light to the inside of the mobile device 500.

Referring to FIG. 5, the mobile device 500 also includes a cover adhesive sheet 520, a glass cover 530, a display panel 540, and a panel bracket 550.

According to exemplary embodiments of the present invention, a touch screen panel 510 as configured above and a mobile device 500 with such a touch screen panel 510 have the following advantages. The touch screen panel 510 is configured in such a way that: a glass plate is patterned with electrodes on one side and coated with a noise shield sheet and an anti-reflection sheet, in order, on the other side; and the glass plate is attached to a transparent area of the glass cover 511 that is cut by a cell unit. The remaining parts of the touch screen panel 510 other than the glass cover 511 can be handled by sheets instead of a cell unit. Because the touch screen panel 510 is manufactured in a sheet unit, the entire manufacture process can be simple, and this makes it possible to achieve mass-production of the touch screen panel. Conventional touch screen panels include films for shielding noise and for preventing reflection. In contrast, the touch screen panel 510 according to exemplary embodiments of the present invention includes the noise shield sheet 515 and the anti-reflection sheet 516 that are coated, in order, on the lower surface of the sensor sheet 514. As is well-known in the art, coating is performed in the angstrom unit; however, the film is thick in the micro-meter unit. Because the touch screen panel according to exemplary embodiments of the present invention is manufactured via coating manner, instead of the film adhering manner using adhesives, the touch screen panel can be manufactured to be thinner than conventional touch screen panels. Accordingly, because the touch screen panel may be manufactured so as to be relatively thinner, mobile devices including such touch screen panels may also be thinner. The advantages of slimming are described as follows referring to FIGS. 3 and 4.

Referring to FIG. 3, the touch screen panel 310 is configured in such a way that the electrode pattern 312 is formed on the lower surface of the glass cover 311. In this configuration, the lower surface of the glass cover 311 cannot be coated with materials for preventing noise or reflection. This is because coating the lower surface with the material damages the electrode pattern 312 and deteriorates the performance of touch sense. Therefore, the touch screen panel 310 is configured in such a way that the noise shield sheet 314 and the anti-reflection sheet 316, formed as films, are attached to the lower surface. That is, the noise shield sheet 314 is attached to the lower surface of the electrode pattern 312 by the first adhesive 313. The anti-reflection sheet 316 is also attached to the lower surface of the noise shield sheet 314 by the second adhesive 315. The touch screen panel 510 is much thinner than the touch screen panel 310.

Referring to FIG. 4, the touch screen panel 410 is configured in such a way that: the first electrode 413 and the second electrode 415 are formed on opposite sides of the sensor sheet 414 which is made of glass; and the sensor sheet 414 is attached on one side of the glass cover 411 via the first adhesive 412. Because the second electrode 415 has a noise shield function, the touch screen panel 410 does not need an additional noise shield sheet. The touch screen panel 410 requires an anti-reflection sheet 417. The anti-reflection sheet 417 cannot be coated on the lower surface of the second electrode 415. That is, the anti-reflection sheet 417 is attached on the lower surface of the second electrode 415 by the second adhesive 416. The touch screen panel 510 is much thinner than the touch screen panel 410.

Figure 6:
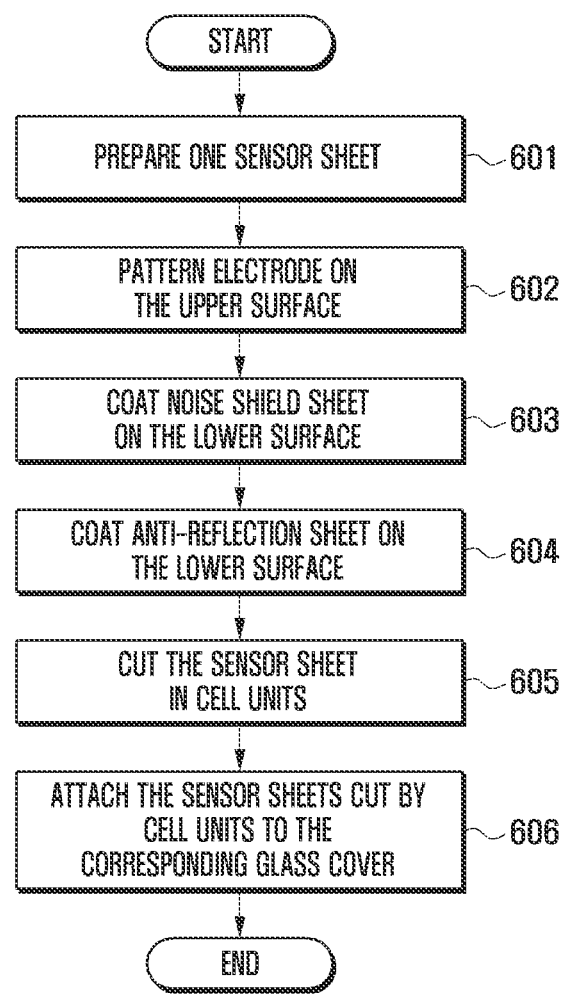
FIG. 6 illustrates a flow chart that describes a method for manufacturing a touch screen according to an exemplary embodiment of the present invention.

FIG. 6 illustrates a flow chart that describes a method for manufacturing a touch screen according to an exemplary embodiment of the present invention.

Referring to FIG. 6, a sensor sheet is prepared where a touch input unit for sensing touches or approaches of passive objects will be formed at step 601. According to an exemplary embodiment of the present invention, the sensor sheet may be a glass plate. The sensor sheet is patterned on one side with first and second electrodes via semiconductor manufacturing equipment that can perform deposition, etching, printing, development, and the like, at step 602. The sensor sheet is coated on the other side with a noise shield sheet at step 603. In other words, for example, the sensor sheet is coated with a noise shield sheet on the side opposite to the side of the sensor sheet on which the first and second electrodes are patterned. The noise shield sheet is coated with an anti-reflection sheet at step 604. The processed sensor sheet, formed on the upper surface with the electrode pattern and coated on the lower surface with the noise shield sheet and anti-reflection sheet, is cut by a cell unit at step 605. The cut sensor sheets are attached to the glass covers respectively, thereby producing touch screen panels at step 606.

As described above, the touch screen according to exemplary embodiments of the present invention is thin and simple in configuration. Accordingly, the touch screen according to exemplary embodiments of the present invention can be mass-produced via simple processes.

While the invention has been shown and described with reference to certain exemplary embodiments thereof, it will be understood by those skilled in the art that many various changes in form and details may be made therein without departing from the spirit and scope of the invention as defined in the appended claims and their equivalents.

What is claimed is:

1. A touch screen panel, the touch screen panel comprising:
    a glass cover configured to transmit light and to protect the touch screen panel;
    a sensor sheet, comprising a single substrate layer and an electrode pattern disposed on only one surface of the single substrate layer, adhered to a lower surface of the glass cover;
    an anti-reflection sheet disposed directly on a lower surface of a noise shield sheet and configured to allow transmission of light and to prevent reflection of light; and
    a display panel disposed below a lower surface of the anti-reflection sheet, wherein the electrode pattern is disposed directly on only an upper surface of the single substrate layer and the noise shield sheet is disposed directly on a lower surface, which is on an opposite side of the upper surface, of the single substrate layer, wherein the single substrate layer is configured to isolate the electrode pattern on the upper surface from the noise shield on the lower surface to thereby prevent damage to the electrode pattern by another layer during a manufacturing process, and wherein the noise shield sheet is configured to allow the transmission of light and to block noise flowing to the electrode pattern.

2. The touch screen panel of claim 1, wherein the electrode pattern creates electrical signals, by a change in capacitance, according to at least one of touches and approaches of a passive object on the glass cover.

3. The touch screen panel of claim 1, wherein the noise shield sheet comprises a transparent conductive film.

4. The touch screen panel of claim 3, wherein the transparent conductive film comprises at least one of Indium Tin Oxide (ITO) and nanomesh.

5. The touch screen panel of claim 3, wherein the transparent conductive film comprises a nanomesh.

6. The touch screen panel of claim 1, wherein the noise shield sheet is disposed directly on the lower surface of the single substrate layer without a thin film formed therebetween.

7. A mobile device, the device comprising:
a display panel; and
a touch screen panel, attached to an upper surface of the display panel, configured to allow transmission of light and to sense at least one of approaches and touches by a passive object on a surface of the touch screen panel, wherein the touch screen panel comprises:
a glass cover configured to transmit light and to protect the touch screen panel;
a sensor sheet, comprising a single substrate layer and an electrode pattern disposed on only one surface of the single substrate layer, adhered to a lower surface of the glass cover; and
an anti-reflection sheet disposed directly on a lower surface of a noise shield sheet and configured to allow transmission of light and to prevent reflection of light, wherein the electrode pattern is disposed directly on only an upper surface of the single substrate layer and the noise shield sheet is disposed directly on a lower surface, which is on an opposite side of the upper surface, of the single substrate layer, wherein the single substrate layer is configured to isolate the electrode pattern on the upper surface from the noise shield on the lower surface to thereby prevent damage to the electrode pattern by another layer during a manufacturing process, and wherein the noise shield sheet is configured to allow transmission of light and to block noise flowing to the electrode pattern.

8. The mobile device of claim 7, wherein the electrode pattern creates electrical signals, by a change in capacitance, according to at least one of touches and approaches of a passive object on the glass cover.

9. The mobile device of claim 7, wherein the noise shield sheet comprises a transparent conductive film, and
wherein the transparent conductive film comprises at least one of Indium Tin Oxide (ITO) and nanomesh.

10. The mobile device of claim 9, wherein the transparent conductive film comprises a nanomesh.

11. The mobile device of claim 7, wherein the noise shield sheet is disposed directly on the lower surface of the single substrate layer without a thin film formed therebetween.

* * * * *